United States Patent [19]
Weder

[11] Patent Number: 5,878,945
[45] Date of Patent: Mar. 9, 1999

[54] SELF-ERECTING CONTAINER

[75] Inventor: Donald E. Weder, Highland, Ill.

[73] Assignee: Southpac Trust International, Inc.

[21] Appl. No.: 14,125

[22] Filed: Jan. 27, 1998

Related U.S. Application Data

[63] Continuation of Ser. No. 780,566, Jan. 8, 1997, Pat. No. 5,752,649, which is a continuation-in-part of Ser. No. 476,180, Jun. 7, 1995, abandoned, which is a continuation-in-part of Ser. No. 413,670, Mar. 30, 1995, abandoned.

[51] Int. Cl.$^6$ .................................................. B65D 5/36
[52] U.S. Cl. ............... 229/117.01; 229/114; 229/117.07; 229/117.3; 229/117.32
[58] Field of Search ................... 229/117.01, 117.03, 229/117.07, 114, 117.27, 117.3, 117.32, 117.35; 220/403, 404, 440, 441, 461

[56] References Cited

U.S. PATENT DOCUMENTS

| | | |
|---|---|---|
| 600,344 | 3/1898 | Frost . |
| 1,689,155 | 10/1928 | Rittenhouse . |
| 2,347,155 | 4/1944 | Leahey ............................................. 40/7 |
| 2,797,512 | 7/1957 | Sieve ............................................ 40/107 |
| 2,887,834 | 5/1959 | Guyer ............................................. 53/32 |
| 2,971,312 | 2/1961 | Bell, Jr. ........................................ 53/390 |
| 3,029,711 | 4/1962 | Griese . |
| 3,267,597 | 8/1966 | Jannes ........................................ 40/126 |
| 3,461,642 | 8/1969 | Langen et al. ................................ 53/29 |
| 3,571,958 | 3/1971 | Stevens et al. ........................... 40/124.1 |
| 3,921,897 | 11/1975 | Noyes et al. ......................... 229/117.01 |
| 3,949,933 | 4/1976 | Giambrone et al. . |
| 4,157,058 | 6/1979 | Vogel . |
| 4,235,159 | 11/1980 | Johnson, Jr. et al. ................... 493/309 |
| 4,247,289 | 1/1981 | McCabe .................................... 493/386 |
| 4,300,312 | 11/1981 | Weder et al. ................................ 47/72 |
| 4,303,405 | 12/1981 | Reichert ..................................... 493/92 |
| 4,586,649 | 5/1986 | Webinger ................................. 229/114 |
| 4,613,391 | 9/1986 | Herlin et al. ............................. 156/213 |
| 4,619,426 | 10/1986 | Drueck, Jr. ............................... 248/174 |
| 4,678,095 | 7/1987 | Barnett et al. ............................... 220/4 |
| 4,733,521 | 3/1988 | Weder et al. ............................... 53/390 |
| 4,773,622 | 9/1988 | Herlin ...................................... 248/174 |
| 5,005,760 | 4/1991 | Van Der Hoogen ..................... 493/121 |
| 5,105,599 | 4/1992 | Weder ........................................ 53/397 |
| 5,244,093 | 9/1993 | Carmichael ................................ 53/397 |
| 5,291,721 | 3/1994 | Weder et al. ............................... 53/390 |
| 5,417,033 | 5/1995 | Weder ........................................ 53/397 |
| 5,496,252 | 3/1996 | Gilbert ...................................... 493/188 |
| 5,752,649 | 5/1998 | Weder ................................. 229/117.01 |

OTHER PUBLICATIONS

The Graphics$^3$ Catalog of Pop–Up Christmas Cards and Desk Top Calendars, Graphics$^3$ Inc., Jupiter, FL, 4 Pages, published at least prior to the filing date Mar. 30, 1995 of co–pending application 08/413,670.

*Primary Examiner*—Gary E. Elkins
*Attorney, Agent, or Firm*—Dunlap, Codding & Rogers, P.C.

[57] ABSTRACT

A self-erecting container which is collapsible into a flat storage position. The container includes a bottom member and a plurality of walls pivotally connected to the bottom member. The container further includes a biasing assembly for biasing the wall members in an erected position, for permitting the wall members to be moved to a collapsed position from the erected position by a bias overcoming force exerted on the wall members, and for drawing the wall members from the collapsed position to the erected position when the bias overcoming force is removed from the wall members.

9 Claims, 10 Drawing Sheets

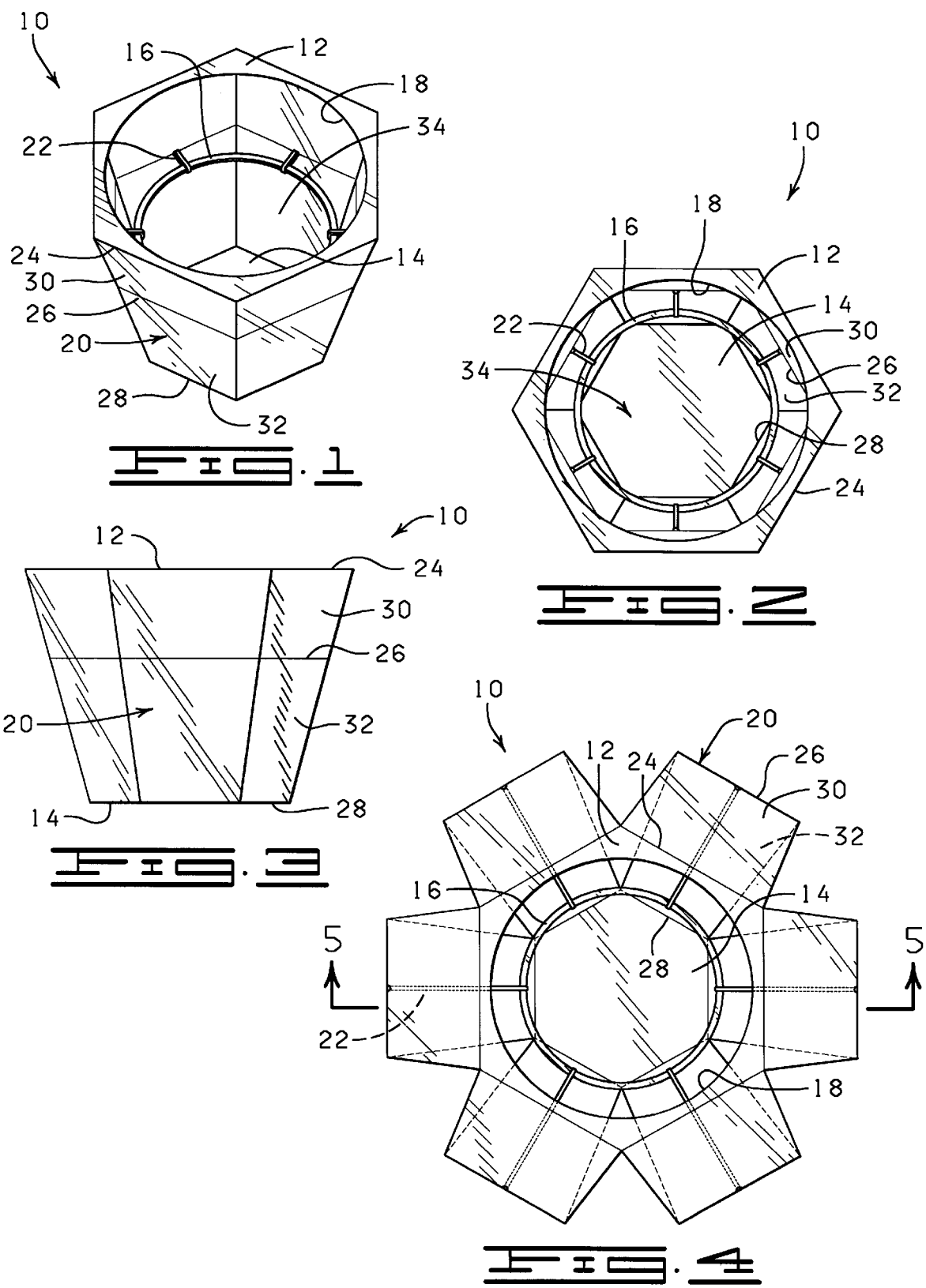

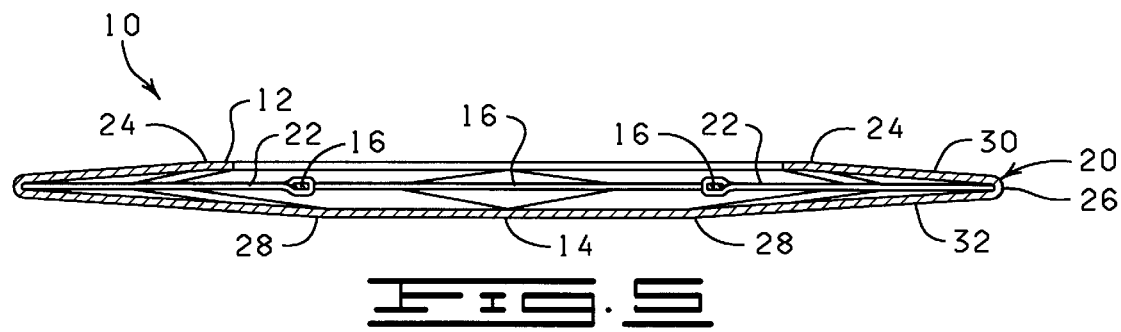
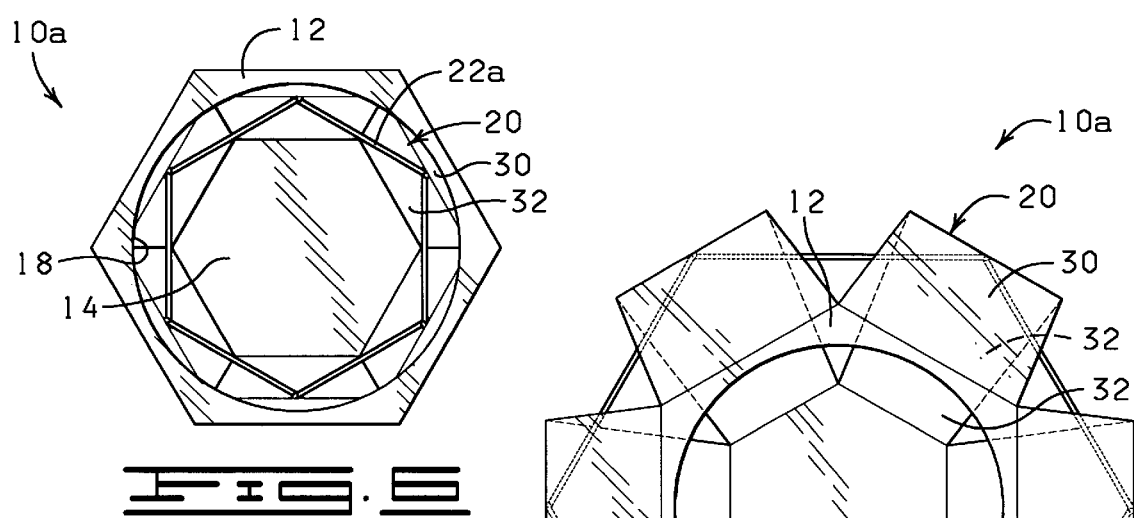
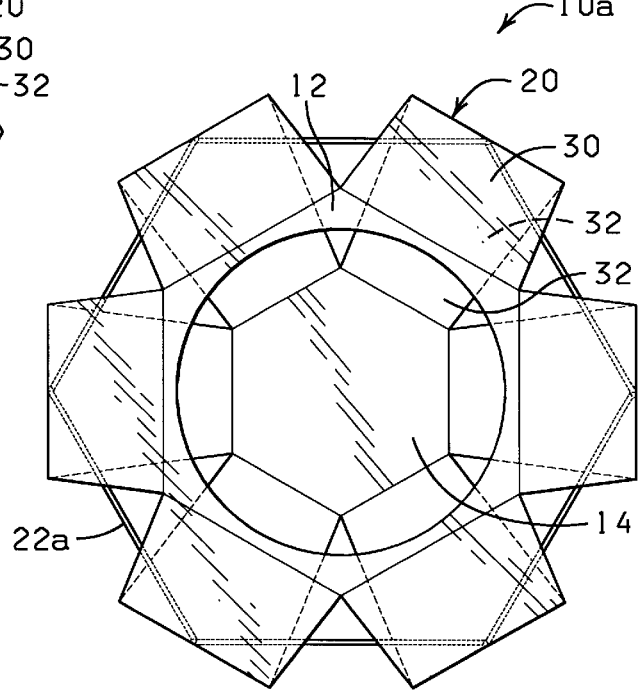
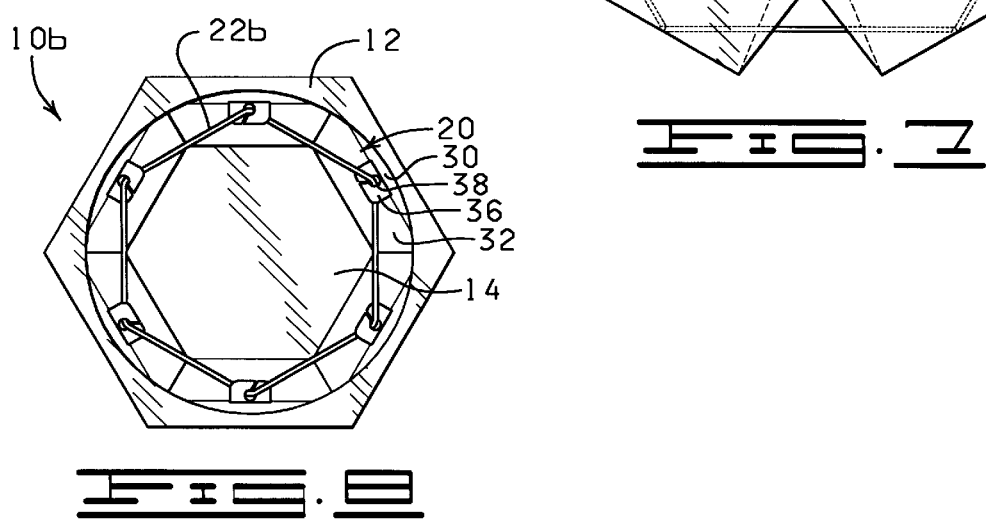

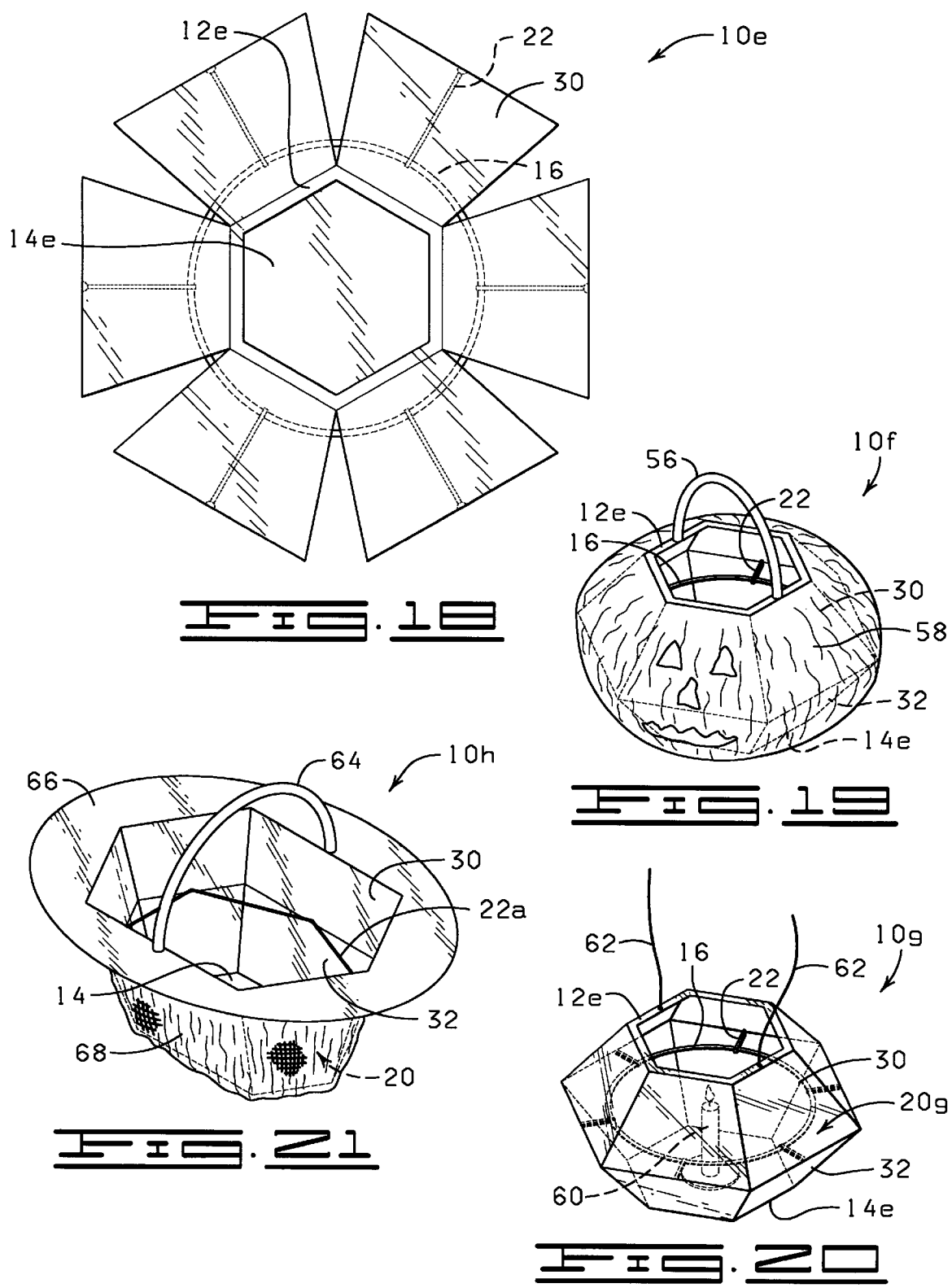

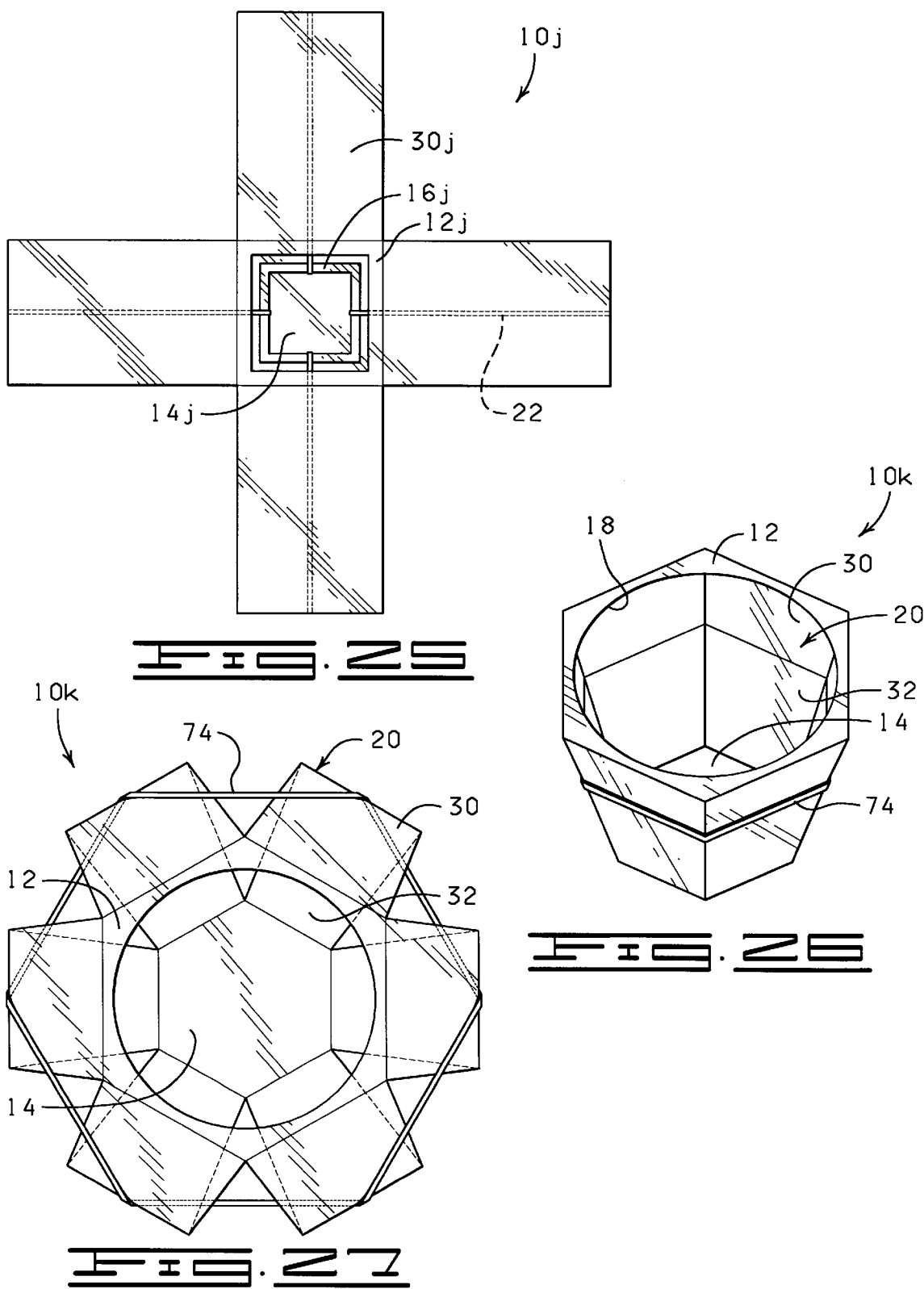

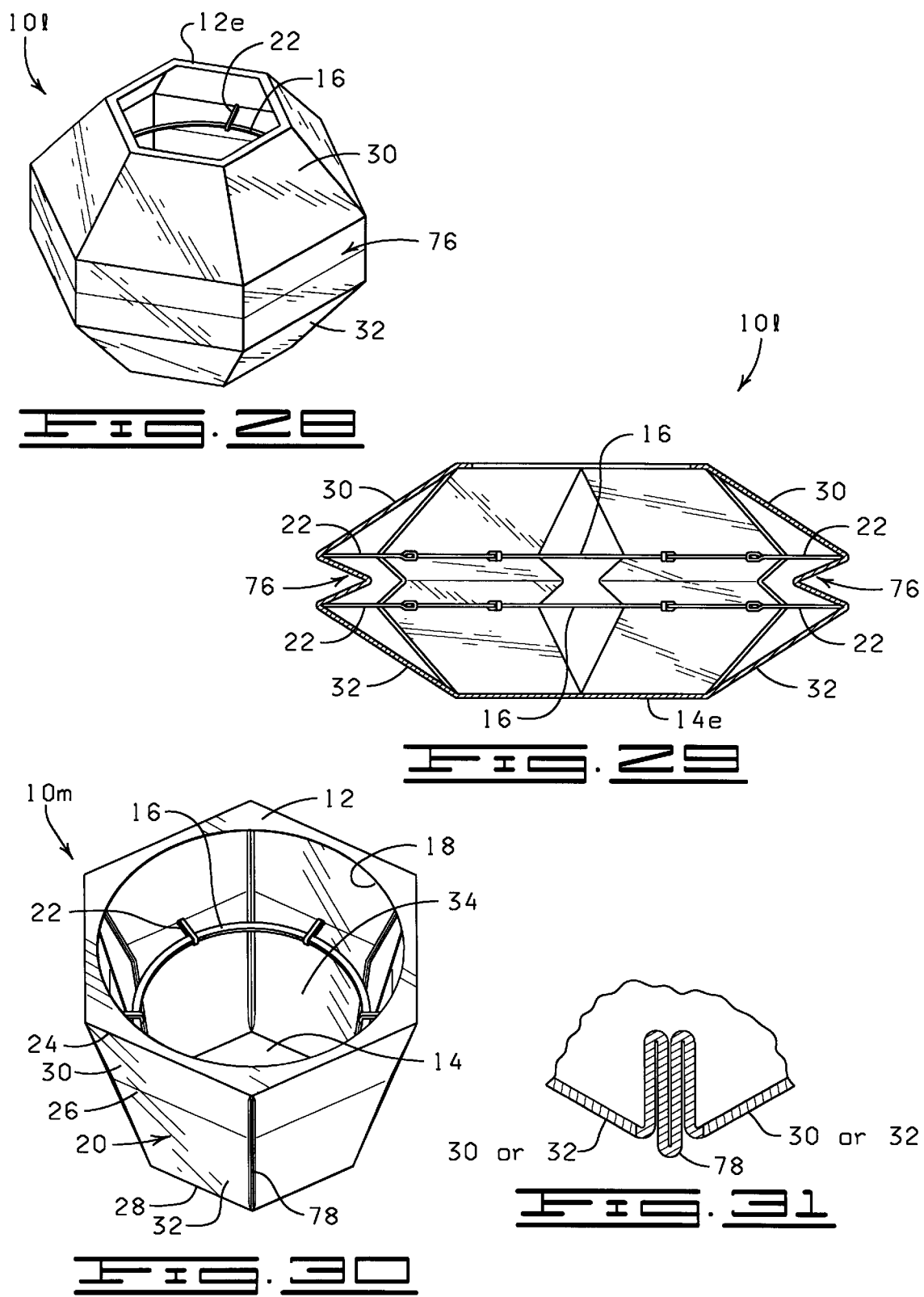

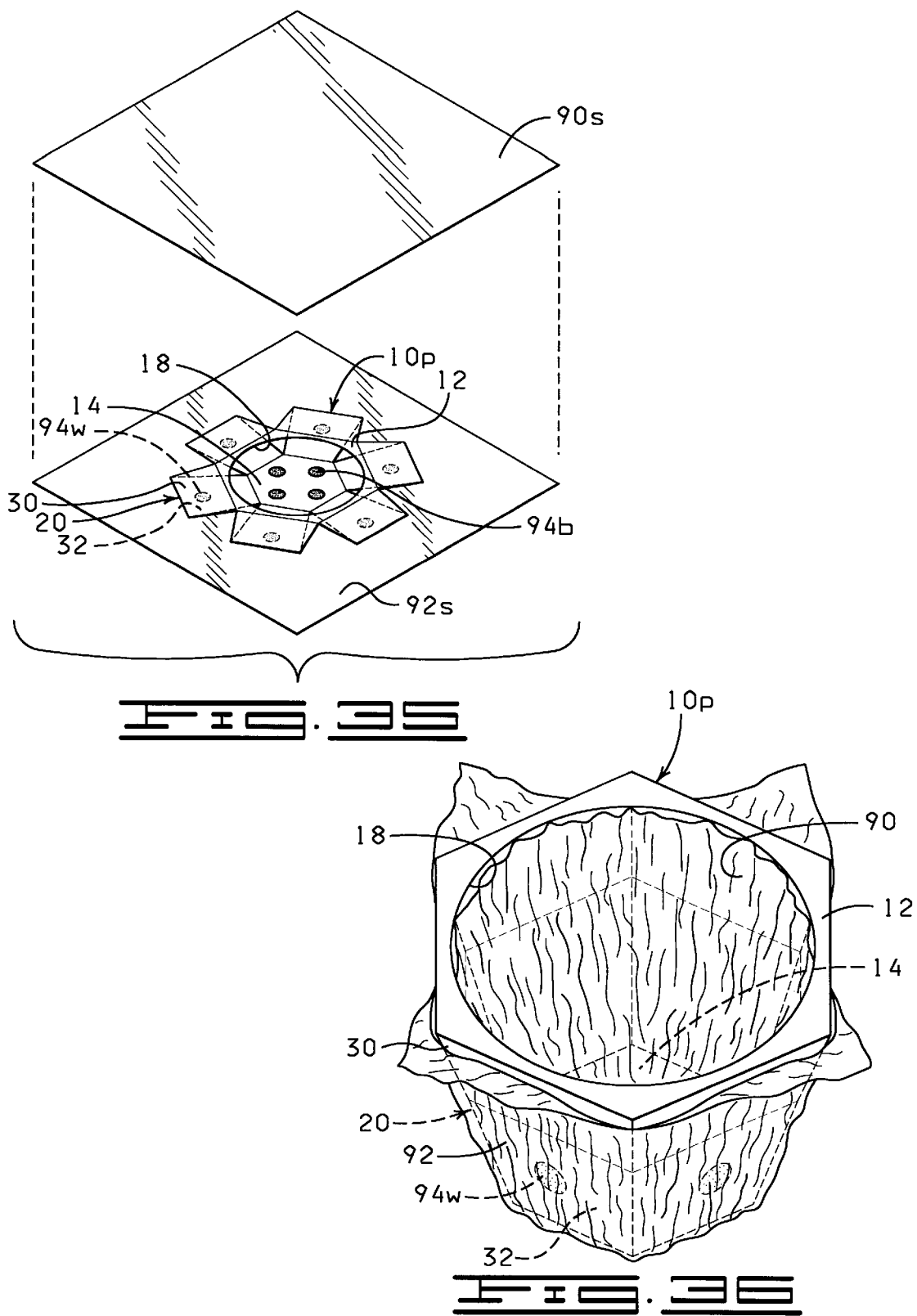

5,878,945

1

SELF-ERECTING CONTAINER

CROSS-REFERENCE TO RELATED APPLICATIONS

This application is a continuation of U.S. Ser. No. 08/780,566, filed Jan. 8, 1997, entitled SELF-ERECTING CONTAINER WITH LINER, now U.S. Pat. No. 5,752,649, which is a continuation-in-part of U.S. Ser. No. 08/476,180, filed Jun. 7, 1995, entitled SELF-ERECTING CONTAINERS WHICH ARE COLLAPSIBLE TO BE SUBSTANTIALLY FLAT, now abandoned, which is a continuation-in-part of U.S. Ser. No. 08/413,670, filed Mar. 30, 1995, entitled SELF-ERECTING CONTAINERS WHICH ARE COLLAPSIBLE TO BE SUBSTANTIALLY FLAT, now abandoned.

STATEMENT REGARDING FEDERALLY SPONSORED RESEARCH OR DEVELOPMENT

Not applicable.

BACKGROUND OF THE INVENTION

1. Field of the Invention

The present invention relates to the field of containers and more particularly, but not by way of limitation, to containers which have a bias for being in an erected position and which assume a flat position when the bias is overcome.

2. Brief Description of Related Art

Various types of collapsible, self-erecting novelty devices are known in the art. For example, U.S. Pat. No. 4,773,622 issued to Herlin discloses an advertising display device which erects itself from a flat configuration. An advertising or display message panel is mounted to the top of the Herlin device. The Herlin device is closed on all sides when in the self-erected condition.

BRIEF SUMMARY OF THE INVENTION

The present invention is a container having side walls which are adapted to assume both a substantially flat position and an erected position. Further, the container is biased for maintaining the side walls in the erected position. By supplying external influence to overcome the erecting bias, the container may be stored with the side walls in the flat position. When the influence is removed, the erecting bias causes the side walls to automatically assume the erected position to place the container in a condition for receiving an item or items.

One object of the present invention is to provide a container which is capable of assuming a substantially flat configuration, but which self-erects into a configuration for receiving an item or items.

Another object of the present invention is to provide self-erecting containers suitable for receiving a wide variety of items.

Other objects, features and advantages of the present invention are apparent from the following detailed description when read in conjunction with the accompanying drawings and appended claims.

BRIEF DESCRIPTION OF THE SEVERAL VIEWS OF THE DRAWING

FIG. 1 is a top perspective view of a self-erecting container constructed in accordance with the present invention with the container in the erected configuration.

FIG. 2 is a top view of the self-erecting container of FIG. 1.

FIG. 3 is a side view of the self-erecting container of FIG. 1.

FIG. 4 is a top view of the self-erecting container of FIG. 1 with the container in the flat configuration.

FIG. 5 is a sectional view of the self-erecting container taken along the lines 5—5 of FIG. 4.

FIG. 6 is a top view of another embodiment of a self-erecting container constructed in accordance with the present invention wherein the container is in the erected configuration.

FIG. 7 is a top view of the self-erecting container of FIG. 6 with the container in the flat configuration.

FIG. 8 is a top view of another embodiment of a self-erecting container constructed in accordance with the present invention. The container is in the erected configuration.

FIG. 18 is a top view of the spheroid self-erecting container of FIG. 17. The container is shown in the flat position.

FIG. 19 is a perspective view of the spheroid self-erecting container of FIG. 17 having a handle and an outer cover for being a pumpkin trick-or-treat basket.

FIG. 20 is a perspective view of a translucent lantern self-erecting container constructed in accordance with the present invention.

FIG. 21 is a perspective view of an Easter basket self-erecting container constructed in accordance with the present invention.

FIG. 25 is a top view of the elongated box container of FIG. 24. The elongated box container is in the flat position.

FIG. 26 is a perspective view of another embodiment of a self-erecting container constructed in accordance with the present invention. The container has an exterior band and is shown in the erected position.

FIG. 27 is a top view of the container of FIG. 26. The container is shown in the flat position.

FIG. 28 is a perspective view of another embodiment of a spheroid self-erecting container constructed in accordance with the present invention. The container is shown in the erected position.

FIG. 29 is a sectional view of the container of FIG. 28. The container is in a position between the erected position and the flat position.

FIG. 30 is a perspective view of another embodiment of a container constructed in accordance with the present invention. This container includes foldable members between the side walls of the container. It should be appreciated that the container is in the erect condition and that the foldable members are in a folded condition.

FIG. 31 is a sectional view of a portion of the container of FIG. 30, illustrating the foldable members in the folded condition.

FIG. 35 is a partly diagrammatical, partly exploded perspective view illustrating a method for applying an inner liner and an outer cover to a self-erecting container constructed in accordance with the present invention.

FIG. 36 is a perspective view of the container of FIG. 35 with the inner liner and outer cover after being allowed to assume the erected condition.

DETAILED DESCRIPTION OF THE INVENTION

Figure 9:
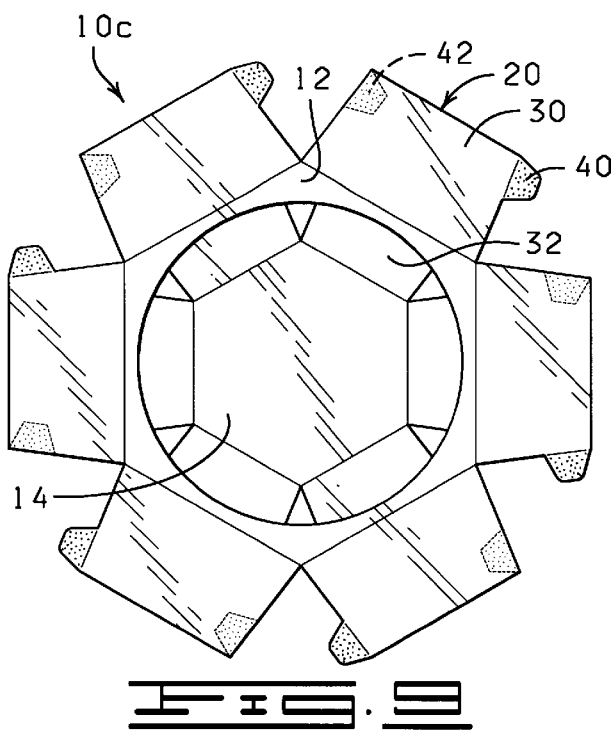
FIG. 9 is a top view of another embodiment of a self-erecting container constructed in accordance with the present invention. The container has adhesive or cohesive areas and is shown in the flat configuration.

Referring to the drawings in general, and to FIGS. 1–5 in particular, shown therein and designated by the general reference numeral 10 is a self-erecting container, which includes a top member 12, a bottom member 14, a plurality of wall members, a bracket 16 and a plurality of elastic members. The top 12 has an opening 18 sized and shaped for depositing items into the container 10.

It should be appreciated that the one wall member designated by reference numeral 20 is generally representative of the plurality of wall members. Similarly, the one elastic member designated by reference numeral 22 is generally representative of the plurality of elastic members.

Each wall member 20 has a top hinge 24, a wall hinge 26 and a bottom hinge 28. Each top hinge 24 allows the corresponding wall member 20 to pivot with respect to the top 12. Each wall hinge 26 allows the corresponding wall member 20 to bend outward and define an upper wall section 30 and a lower wall section 32. Similarly, each bottom hinge 28 allows the corresponding wall member 20 to pivot with respect to the bottom 14 of the container 10.

With this construction, the container 10 may assume an erected position (FIGS. 1 through 3) and a flat position (FIGS. 4 and 5). In the erected position, the container 10 is suitable for receiving an item, such as a flower pot. In the storage position, the wall members 20 of the container 10 are collapsed such that the container 10 is substantially flat. In the storage position, the top 12 and the bottom 14 of the container 10 are moved together and each upper wall section 30 closely overlays the corresponding lower wall section 32.

Each elastic member 22 extends between a corresponding one of the wall members 20 and the bracket 16 to suspend the bracket 16 within the container 10. The bracket 16 has a bracket opening 34 which may be any suitable size and shape for allowing an item or items to be deposited into the container 10.

Each elastic member 22 may be connected to the bracket 16 and the corresponding wall member 20 in any appropriate manner known in the art. Further, each elastic member 22 may be connected to the upper wall section 30, the lower wall section 32, or both the upper and lower wall sections of the corresponding wall member 20.

The elastic members 22 and the bracket 16 cooperate to bias the container 10 into the erected position (FIGS. 1 and 2). Under an external influence to overcome the bias of the elastic members 22, the container 10 may be collapsed into the flat storage position (FIGS. 4 and 5). Each wall member 20 moves outward at the wall hinge 26 to stretch the corresponding elastic member 22 as the container 10 is forced to collapse flat.

When the bias-overcoming influence is removed, the elastic members 22 return to the unstretched condition and cause the container 10 to automatically assume the erected position. Thus, the container 10 is self-erecting.

A quantity of the containers 10 may be compressed into the flat storage position, stacked and shipped or stored in a suitable shipping box. Further, one container 10 may be stored in the flat storage position within a sleeve similar to a phono record album cover.

Alternatively, containers 10 may be maintained in a box or shelving having a plurality of mail-slot shelves. Within one of the mail-slot shelves, at least one of the containers 10 is maintained in the flat storage position. When withdrawn from the mail-slot shelf, the container 10 automatically assumes the erected position.

It should be appreciated that any suitable devices known in if the art may be used for the elastic members 22 as the means for biasing the container 10 into the erected position. Such devices include, but are not limited to, rubber bands, coiled springs and flat springs.

The top 12, bottom 14 and walls 20 of the container 10 may be constructed of a wide variety of materials, such as paper, cardboard, wood, metal, polypropylene and various types of natural and synthetic materials. At least the perimeter of the top 12 and bottom 14 of the container 10 should have enough rigidity to sustain the container 10 in the appropriate shape for the erected position.

If a semi-flexible or semi-rigid material is used for the walls 20, the top hinge 24, the wall hinge 26 and the bottom hinge 28 may simply be bends, folds, scored lines or indented lines in the material. If a substantially rigid material is employed for the walls 20, the upper wall sections 30 and the lower wall sections 32 may be separate panels connected by any conventional hinging mechanism.

At least the walls 20 of the container 10 may be constructed of a material which possesses inherent elastic or memory properties. Materials such as butyl rubber, polyvinyl chloride (PVC), ethylene vinyl acetate (EVA) and the like have such properties.

The hinges 24, 26 and 28 may be constructed of butyl rubber, PVC, EVA or the like to have an internal bias for forcing the container 10 into the erected position. In such a case, the internal bias of the walls 20 themselves acts as the means for biasing the container 10 into the erected position and the bracket 16 and elastic members 22 are not necessary.

Although shown in FIGS. 1–5 as being generally hexahedral in shape, the container 10 may be constructed in a wide variety of shapes. It should be understood that the container 10 may be made in any polyhedral or other shape consistent with the concepts and purposes disclosed herein.

Embodiment of FIGS. 6–8

Referring to FIGS. 6 and 7, shown therein and designated by reference character 10a, is another embodiment of a container constructed in accordance with the present invention. The container 10a is like the container 10 in most respects. However, instead of having the bracket 16, the container 10a has elastic members extending from wall to adjacent wall within the container 10a.

One of the elastic members is designated by reference character 22a and is generally representative of the elastic members within container 10a. The elastic members 22a extend between adjacent walls 20 within the container 10a to bias and sustain the container 10a in the erected position (FIG. 6) and define an opening for receiving items into the container 10a.

When an external influence pushes the top 12 and bottom 14 of the container 10a toward one another, the elastic members 22a stretch as the walls 20 collapse. Eventually, the container 10a may be fully collapsed into the flat storage position (FIG. 7).

It should be appreciated that any elastic material may be used for the elastic members 22a, as well as coiled springs, flat springs and the like. It should also be appreciated that the elastic members 22a may be attached to the walls in any suitable manner and may be connected to the upper wall sections 30, the lower wall sections 32, or both.

Referring to FIG. 8, shown therein and designated by reference character 10b is a container which is similar to the container 10a. However, container 10b includes an elastic loop 22b, such as a rubber band, and a plurality of wall tabs for receiving the elastic loop 22b.

One of the wall tabs is designated by reference numeral 36 and is generally representative of the wall tabs of container 10b. Each wall tab 36 has a tab slot 38 shaped to receive a portion of the elastic loop 22b. Further, each tab slot 38 is shaped such that the corresponding wall tab 36 retains the elastic loop 22b until the elastic loop 22b is manually removed from the tab slot 38.

With this construction, the container 10b functions exactly like container 10a. However, the elastic loop 22b is easily removed and replaced.

It should be appreciated that the wall tabs 36 may extend from the upper wall section 30 or the lower wall section 32 of the walls 20 of the container 10b. Further, each wall tab 36 may comprise a first wall tab extending from the upper wall section 30 and a second wall tab extending from the lower wall section 32. In this case, the first and second wall tabs may be connected by an adhesive, a cohesive or in any other suitable manner.

Embodiment of FIG. 9

With reference to FIG. 9, shown therein and designated by reference character 10c is another embodiment of a self-erecting container constructed in accordance with the present invention.

The container 10c includes a plurality of retaining tabs extending from each wall 20 and complementary retaining tab areas located on each wall 20. One of the retaining tabs is designated by reference numeral 40 and is generally representative of the retaining tabs of the container 10c. Similarly, one of the retaining areas is designated by reference numeral 42 and is generally representative of the retaining areas of the container 10c.

Each retaining tab 40 extends laterally from one side of the corresponding wall 20. Each retaining tab area 42 is located at the opposite side and on the inside surface of the wall 20.

An adhesive or cohesive material is disposed on the outer surface of each retaining tab 40. Further, an adhesive or cohesive material is disposed on each retaining tab area 42.

When the container 10c assumes the erected position, each retaining tab 40 moves into contact with the retaining tab area 42 of the adjacent wall 20. Upon contact, the adhesive or cohesive material on each one of the retaining tabs 40 bonds with the adhesive or cohesive material on the corresponding retaining tab area 42. The bonding of the retaining tabs 40 with the retaining tab areas 42 maintains the container 10c in the erected position.

It should be appreciated that the retaining tab 40 and retaining tab area 42 construction of the container 10c may be applied to any of the various self-erecting embodiments disclosed herein. Alternatively, the container 10c may be erected manually. It should also be appreciated that the adhesive or cohesive of the retaining tabs 40 and retaining tab areas 42 may provide a substantially permanent bond or may provide a weak bond so that the container 10c may be re-collapsed to the flat storage position.

Figure 10:
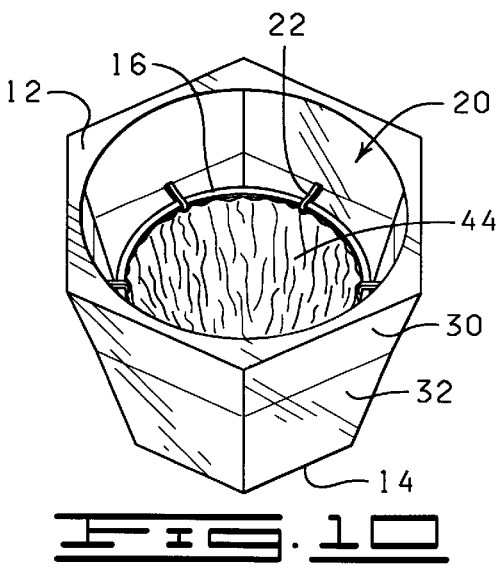
FIG. 10 is a top perspective view of another embodiment of a self-erecting container constructed in accordance with the present invention. The container has an inner liner suspended from the ring.
Figure 11:
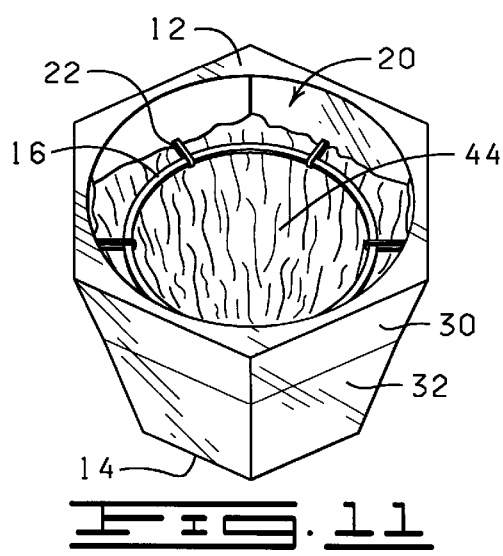
FIG. 11 is a top perspective view of another embodiment of a self-erecting container constructed in accordance with the present invention. The container has an inner liner suspended from the walls of the container.
Figure 12:
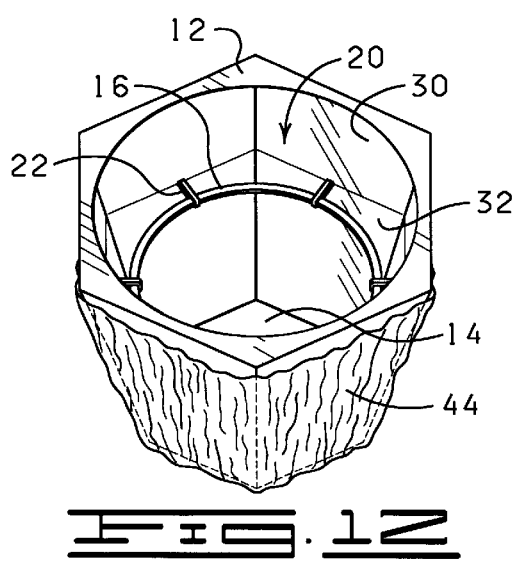
FIG. 12 is a top perspective view of another embodiment of a self-erecting container constructed in accordance with the present invention. The container has an outer liner.

Embodiment of FIGS. 10 through 12

If the container 10 is to be used for a plant pot cover or a plant pot containing living plants, it is desirable that the container 10 be designed not to leak soil and liquids. Accordingly, container 10 may include a waterproof liner 44.

As shown in FIG. 10, the waterproof liner 44 may be suspended from the bracket 16 within the container 10. Obviously, it is preferable that the waterproof liner 44 be flexible in order to collapse when the container 10 is forced to assume the flat storage position.

As illustrated in FIG. 11, the waterproof liner 44 may be suspended from the walls 20 within the container 10. As shown in FIG. 12, the waterproof liner 44 may be suspended from the walls 20 outside the container 10 as well. Further, the liner 44 may be suspended from the top 12 of the container 10. It should be appreciated that the waterproof liner 44 may be suspended from the walls or top member to be inside or outside any of the various containers disclosed herein.

Further, the liner 44 may be constructed of an elastic material in the shape of the container 10 and attached to the walls 20 inside or outside the container 10. With this construction, the liner 44 may be utilized to bias the container 10 into the erected position. When the container 10 is forced into the storage position, the collapsed walls 20 stretch the liner 44 outward until the container 10 is substantially flat.

Figure 13:
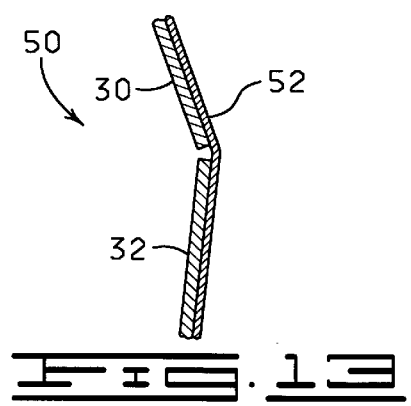
FIG. 13 is a sectional view of an embodiment of a portion of two wall members of a self-erecting container constructed in accordance with the present invention. The wall members are connected by a flexible layer.
Figure 14:
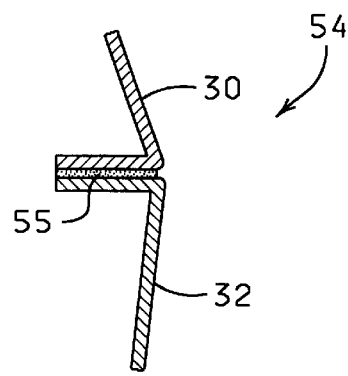
FIG. 14 is a sectional view of another embodiment of a portion of two wall members of a self-erecting container constructed in accordance with the present invention. The wall members are joined by an adhesive connection and are adapted to flex at an outer area of the connection.

Embodiment of FIGS. 13 and 14

Referring to FIG. 13, shown therein and designated by reference numeral 50 is a wall hinge of a self-erecting container constructed in accordance with the present invention.

The hinge 50 includes the upper wall section 30 and the lower wall section 32 connected for pivotation by a flexible layer 52. The upper wall section 30 and the lower wall section 32 should be separated such that they may be moved to place the container in both the erected position and in the flat storage position.

The flexible layer 52 may be attached to the wall sections 30 and 32 with an adhesive or a cohesive material, by use of a laminating process, or by any other conventional means.

In one preferred embodiment, the flexible layer 52 comprises butyl rubber, other elastic material or a heat shrinkable or otherwise shrinkable material. During the laminating or shrinking process, the flexible layer 52 is retained at the angle corresponding to the erected position of the container.

With this construction, the flexible layer 52 provides the bias for the container to be in the erected position. When an external influence forces the container into the flat storage position, the flexible and elastic layer 52 stretches. When the external influence is removed, the flexible and elastic layer 52 causes the container to return to the erected position.

It should be appreciated that the structures disclosed for the wall hinge 50 may be employed for the top hinge 24, the wall hinge 26 and the bottom hinge 28 of any of the containers disclosed herein.

With reference to FIG. 14, shown therein and designated by reference numeral 54 is another type of wall hinge for a self-erecting container constructed in accordance with the present invention. The hinge 54 includes the upper wall section 30 and the lower wall section 32 joined by an adhesive or cohesive material 55.

With this particular construction, the wall sections 30 and 32 at least at the hinge point should be sufficiently flexible to place the container in either the erected position or the flat storage position. The joined portions of the upper and lower wall sections 30 and 32 may serve as the wall tab 36 disclosed hereinabove and shown in FIG. 8.

It should be appreciated that the construction of the hinge 54 may be used for the top hinge 24, the wall hinge 26 and the bottom hinge 28 of any of the containers disclosed herein.

Figure 15:
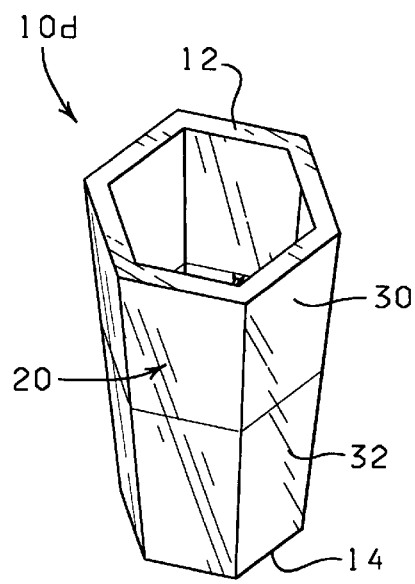
FIG. 15 is top perspective view of another embodiment of a tall self-erecting container constructed in accordance with the present invention. The container is in the erected configuration for receiving a floral arrangement or other items.
Figure 16:
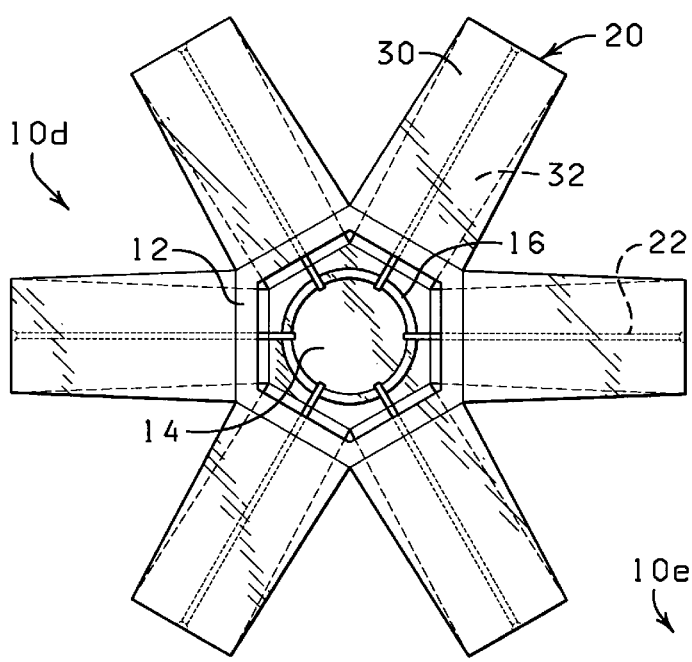
FIG. 16 is a top view of the self-erecting container of FIG. 15. The container is shown in the flat configuration.

Embodiment of FIGS. 15 and 16

Referring to FIGS. 15 and 16, shown therein and designated by reference character 10d is a tall, self-erecting container constructed in accordance with the present invention.

The container 10d is constructed like any of the containers disclosed hereinabove, but has lengthened wall members 20. Thus, the container 10d is particularly useful as a flower vase or other container requiring an elongated shape. It should be appreciated that the container 10d may be provided with any of the hinge and container-biasing structures disclosed herein.

Embodiments of FIGS. 17–20

Figure 17:
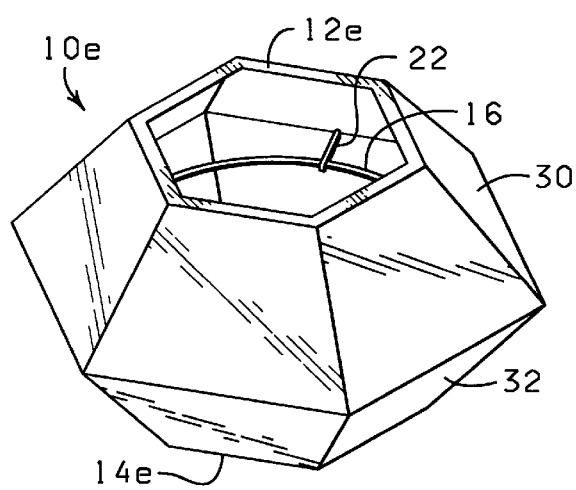
FIG. 17 is a perspective view of a spheroid self-erecting container constructed in accordance with the present invention. The container is shown in the erected position.

With reference to FIGS. 17 and 18, shown therein and designated by reference character 10e is a self-erecting container in the shape of a polyhedral spheroid.

The container 10e is constructed and functions like the containers disclosed hereinabove. However, container 10e has a top 12e and a bottom 14e which have substantially the same outside dimensions.

The container 10e is spheroidal in shape when in the erected position (FIG. 17) and substantially flat when in the storage position (FIG. 18). It should be appreciated that the container 10e may include any of the hinge mechanisms, structures for biasing the container 10e into the erected position, and other features which are disclosed herein.

Referring to FIG. 19, shown therein and designated by reference character 10f is the container 10e modified to have a handle 56 and a decorative outer liner 58 resembling a jack-o'-lantern. The decorative outer liner 58 should be flexible to collapse when the container 10f is forced to assume the flat storage position. Further, it may be desirable for the handle 56 to be flexible, collapsible or pivotally mounted for being moved flat against the container 10f when the container 10f is forced to assume the storage position.

The container 10f may be used as a decorative item or as a trick-or-treat container when in the erected position. When forced into the storage position, the container 10f is substantially flat for convenient storage.

With reference to FIG. 20, shown therein and designated by reference character 10g is the container 10e provided with translucent walls 20g. A candle 60 or other source of light may be mounted within the container 10g to use the container 10g as a lantern. The container 10g may have strings 62 or any other conventional means for mounting the container 10g to a supporting structure.

Any pattern, design or illustration may be disposed on the walls 20g of the container 10g for decorative, festive or informational effect. Alternatively, the walls 20g of the container 10g may be substantially transparent with a decorative outer liner (not shown in FIG. 20).

Embodiment of FIG. 21

Referring to FIG. 21, shown therein and designated by reference character 10h is the self-erecting container 10a modified to resemble a basket. The container 10h includes a basket handle 64, a basket brim 66 extending outward from the top of container 10h, and an outer liner 68 resembling a basket.

The basket handle 64 may be flexible, collapsible or pivotable for being flat with the rest of the container 10h when the container 10h is forced to assume the storage position. In place of the outer liner 68, the walls 20 of the container 10h may be provided with an outer appearance resembling a basket.

If the basket is fashioned to be an Easter basket, figures of bunnies, Easter eggs and other Easter symbols may be supported by the upper or lower wall sections 30 and 32 of the basket container 10h. In this way, the Easter symbols lie flat with the walls 20 when the container 10h is in the storage position and pop up when the container 10h assumes the erected position.

The basket container 10h may also be designed as a fruit, vegetable, plant or flower basket. In such case, representations of fruit, vegetables, plants or floral groupings may be mounted to the walls 20 of the basket container 10h to be erected or collapsed with the walls 20 of the container 10h.

Embodiments of FIGS. 22–25

Figure 22:
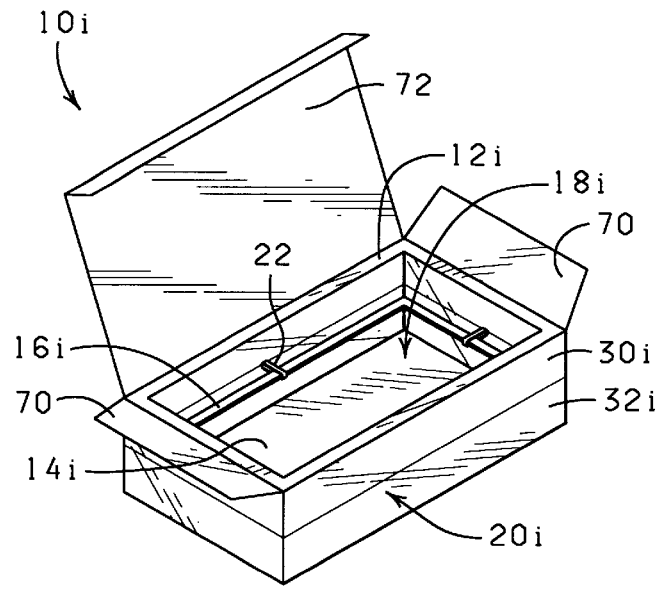
FIG. 22 is a perspective view of a self-erecting box container constructed in accordance with the present invention. The box container is shown in the erected position.
Figure 23:
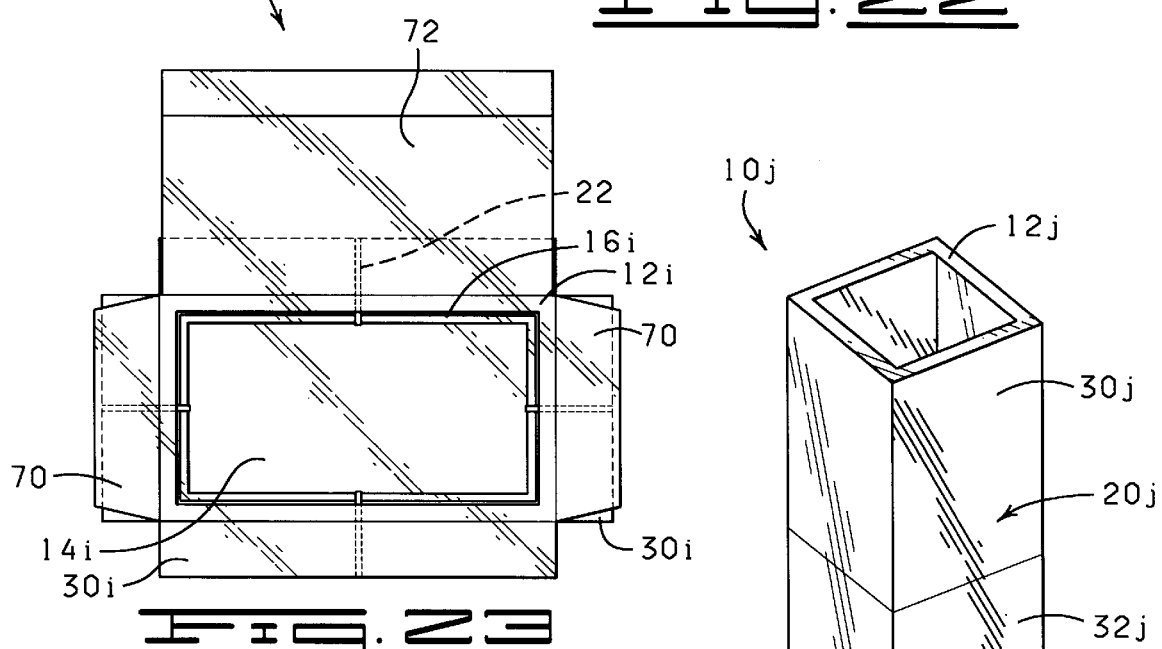
FIG. 23 is a top view of the box container of FIG. 22. The box container is in the flat position.

With reference to FIGS. 22 and 23, shown therein and designated by reference character 10i is a self-erecting box container constructed in accordance with the present invention. The box container 10i has a rectangular top 12i, a rectangular bottom 14i, and rectangular walls 20i.

The top 12i of the box container 10i has an opening 18i to receive items into the box container 10i. An end flap 70 extends from the top 12i of the box container 10i at each end and a lid 72 extends from the top 12i along at least one side of the box container 10i. It should be appreciated that the end flaps 70 and the lid 72 may be folded over the opening 18i of the box container 10i to close the opening 18i of the box container 10i.

Similar to the embodiments previously disclosed, the end walls 20i of the box container 10i have an upper wall section 30i and a lower wall section 32i which are hinged to pivot with respect to each another and with respect to the top 12i and bottom 14i of the box container 10i. Thus, the box container 10i may assume the erected position for receiving items (FIG. 22) or the flat storage position (FIG. 23).

A rectangular bracket 16i is suspended within the box container 10i by a plurality of elastic members 22. Each elastic member 22 extends between the bracket 16i and a corresponding one of the walls 20i. Thus, the bracket 16i and the elastic members 22 cooperate to bias the box container 10i into the erected position shown in FIG. 22. When an external influence is applied to the box container 10i to overcome the bias, the elastic members 22 are stretched and the box container 10i is forced to assume the flat storage position illustrated by FIG. 23.

The box container 10i may be used as a shipping carton, a gift box, a flower box, a pet litter box, an accessory or litter box for a vehicle, a waste receptacle, a jewelry box, a cake box, a food tray or food service box and many other articles. For some of these uses, it is desirable to provide a flexible, waterproof inner liner (not shown in FIGS. 22 and 23) which extends from the top 12i to the bottom 14i of the box container 10i to the inside of the bracket 16i. In this way, the liner isolates the contents of the box container 10i from the walls 20i, bracket 16i and elastic members 22. The liner may also be suspended from the bracket 16i or from the walls 20i.

It should be appreciated that any of the hinge structures disclosed herein may be used with the box container 10i. Further, any of the means for biasing the container into the erected position disclosed herein may be employed with the box container 10i.

It should also be appreciated that many shapes of self-erecting containers may be constructed for uses disclosed for the container 10i. For example, self-erecting containers may be in the shape of a cube or in the shape of a wide variety of polyhedrons.

Figure 24:
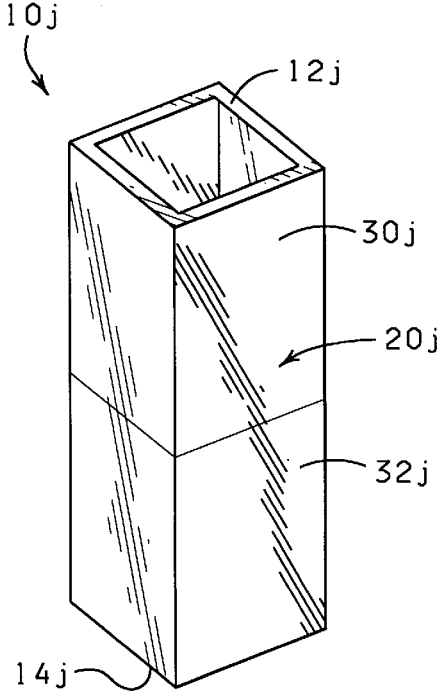
FIG. 24 is a perspective view of a self-erecting elongated box container constructed in accordance with the present invention.

With reference to FIGS. 24 and 25, shown therein and designated by reference character 10j is a self-erecting tall box container constructed in accordance with the present invention. The tall box container 10j is similar in structure and function to the box container 10i.

The tall box container 10j has a square top 12j, a square bottom 14j, a square bracket 16j and elongated walls 20j. The tall box container 10j may be constructed with or without closure lid and flaps (not shown in FIGS. 24 and 25).

Embodiment of FIGS. 26 and 27

Referring to FIGS. 26 and 27, shown therein and designated by reference character 10k is a self-erecting container having an outer band 74. The container 10k has the top 12, bottom 14 and walls 20 for allowing the container 10k to assume the erected position (FIG. 26) and the flat storage position (FIG. 27).

As shown in FIG. 26, the outer band 74 extends around the outer periphery of the container 10k at the connection between the upper and lower wall sections 30 and 32 of the walls 20. As best seen in FIG. 27, the outer band 74 is attached by an adhesive or mechanical connection to each wall 20. Typically, the outer band 74 is attached to the upper wall section 30, the lower wall section 32, or both, at a point about halfway across each wall 20.

The outer band 74 may be constructed of butyl rubber or any conventional elastic material. Alternatively, the outer band 74 may be a coiled or flat spring or any known device which may be stretched or extended with a bias to return to its normal dimension.

When the container 10k is in the erected position (FIG. 26), the outer band 74 provides tension to maintain the container 10k in the erected position. When an external influence overcomes the bias of the outer band 74 to collapse the walls 20, the outer band 74 stretches to allow the container 10k to assume the flat storage position (FIG. 27). As soon as the external influence is removed, the bias of the outer band 74 returns to its normal dimension and causes the container 10k to automatically assume the erected position.

Embodiment of FIGS. 28 and 29

With reference to FIGS. 28 and 29, shown therein and designated by reference character 10l is another embodiment of a self-erecting container in the shape of a polyhedral spheroid. The container 10l is like the container 10e disclosed hereinabove, except that the container 10l has a plurality of inwardly hinged middle wall sections 76.

As best seen in FIG. 29, two sets of brackets 16 and elastic members 22 are used to bias the container 10l into the erected position. One of the brackets 16 is suspended by the elastic members 22 from the hinges between the upper wall sections 30 and the middle wall sections 76. The other bracket 16 is suspended by the elastic members 22 from the hinges between the lower wall sections 32 and the middle wall sections 76.

Absent any external influence, the brackets 16 and elastic members 22 cooperate to maintain the container 10l in the erected position (FIG. 28). In this position, each middle wall section 76 is a substantially flat surface.

Under external influence to flatten the container 10l, the elastic members 22 stretch and the walls 20 collapse with the middle wall sections 76 folding inward (FIG. 29). As soon as the external influence is removed, the bias of the elastic members 22 causes the container 10l to automatically assume the erected position.

It should be appreciated that any of the structures for hinges disclosed herein may be utilized in conjunction with the container 10l. It should also be understood that other means for biasing containers to be self-erecting and other features disclosed herein may be used in connection with the container 10l.

Figure 32:
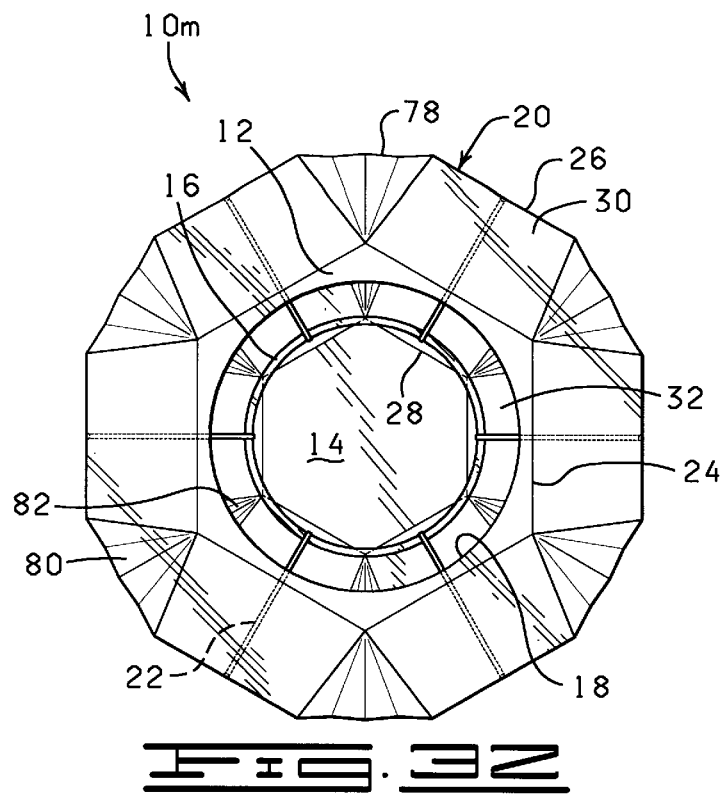
FIG. 32 is a top view of the container of FIG. 30 in the flat position, wherein the foldable members are in an unfolded condition.

Embodiment of FIGS. 30–32

Referring to FIGS. 30 through 32, shown therein and designated by reference character 10m is another self-erecting container constructed in accordance with the present invention. The container 10m includes foldable members between the side walls 20 of the container 10m.

One of the foldable members is designated by reference numeral 78 and is generally representative of the foldable members of the container 10m.

As best seen in FIG. 30, each foldable member 78 extends from the top 12 to the bottom 14 of the container 10m. Further, each foldable member 78 is secured to the upper members 30 and lower members 32 of the walls 20 on both sides of the respective foldable member 78.

The foldable members 78 may be secured to the top 12, bottom 14 and respective wall members 30 and 32 in a wide variety of ways. For example, the foldable members 78 may be attached to the inside surface or the outside surface of the top 12, bottom 14 and wall members 30 and 32. Alternatively, the top 12, bottom 14 or wall members 30 and 32 may be constructed in two layers and the foldable members 78 may be secured between the two layers.

The foldable members 78 may be portions of a liner which extends partially or completely around the interior or the exterior of the top 12, bottom 14 or wall members 30 and 32. In the two-layer construction, the foldable members may be portions of a liner which extends partially or completely between the layers of the top 12, bottom 14 or wall members 30 and 32.

Numerous conventional methods for attachment may be used to secure the foldable members 78 in place. Such methods include, but are not limited to, gluing, adhesion, cohesion, heat-sealing, lamination and mechanical connectors of all kinds.

The foldable members 78 may be made of any flexible, semi-rigid or rigid material known in the art which is capable of being placed in the unfolded condition shown in FIG. 32 and in the folded condition shown in FIGS. 30 and 31.

The foldable members 78 may be made of a material which can be constructed to have an internal bias. Examples of such materials are disclosed hereinabove. By constructing the foldable members from such materials to have an internal bias for being in the folded condition, the foldable members 78 may supply part of or all of the means for biasing the container 10m into the erected condition.

If it is desirable for the container 10m to remain in the erected condition on a permanent or semi-permanent basis, the foldable members 78 may be constructed to be adhesive or cohesive. In this manner, the folds of each foldable member 78 will automatically secure themselves together when the container 10m springs from the flat condition into the erected condition.

The container 10m may be used to contain live plants, which require water and soil. Thus, it is desirable that the container 10m be waterproof. Therefore, the wall members 30 and 32 (or at least the lower wall members 32), the foldable members 78 and the bottom 14 of the container 10m are typically constructed of waterproof materials. If the foldable members 78 are part of a continuous liner which is coextensive with the bottom 14 and the wall members 30 and 32, then the liner need only be waterproof.

In operation, the container 10m is biased to be in the erected condition (FIG. 30). In this condition, each foldable member 78 is substantially straight from top to bottom and is folded together (FIGS. 30 and 31). It should be appreciated that the folds of each foldable member 78 may extend toward the inside, the outside or both the inside and outside of the container 10m.

When external pressure overcomes the bias of container 10m, the container 10m may be forced to assume the flat condition (FIG. 32). In this condition, each foldable member 78 is unfolded laterally, but bent over from top to bottom such that a top portion 80 of each foldable member 78 overlays a bottom portion 82 of the foldable member 78.

When the external pressure is removed, the container 10m erects itself. It should be appreciated that any of the means disclosed herein for biasing containers into the erect condition may be employed with the container 10m.

Figure 33:
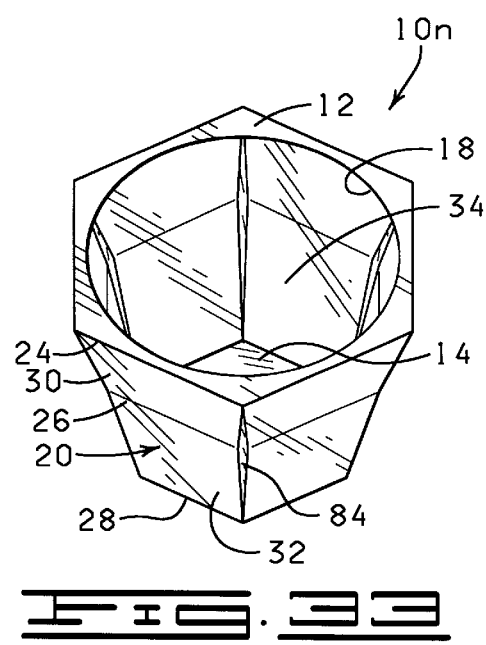
FIG. 33 is a perspective view of another embodiment of a container constructed in accordance with the present invention. This container includes stretchable members between the side walls of the container. It should be appreciated that the container is in the erect condition and the stretchable members are in an unstretched condition.
Figure 34:
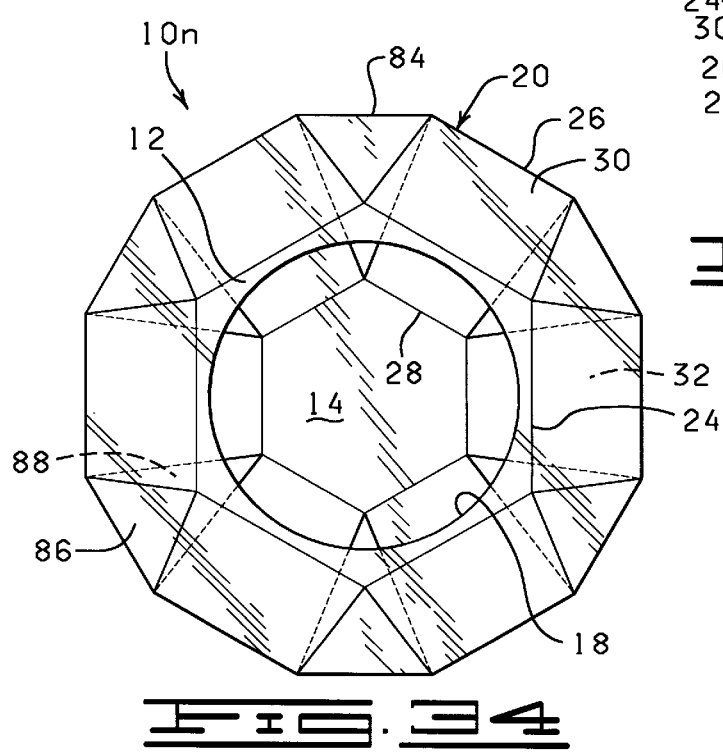
FIG. 34 is a top view of the container of FIG. 33 in the flat position, wherein the stretchable members are in a stretched condition.

Embodiment of FIGS. 33 and 34

With reference to FIGS. 33 and 34, shown therein and designated by reference character 10n is another container constructed in accordance with the present invention. The container 10n is similar to the container 10m. However, the container 10n has stretchable members instead of the foldable members 78. One of the stretchable members is designated by reference numeral 84 and is generally representative of the stretchable members of the container 10n.

Each one of the stretchable members 84 extends between two adjacent walls 20 of the container 10n. The stretchable members 84 may be connected to the top 12, the bottom 14 and the wall members 30 and 32 of the container 10n in any manner disclosed herein.

Each stretchable member 84 should be flexible and elastic enough to assume the stretched and folded over condition shown in FIG. 34. Thus, the stretchable members 84 may be made of natural or synthetic rubber or any elastic material known in the art. It may be desirable that the stretchable members 84 be inherently waterproof or be waterproofed in any conventional manner, so that the container ion does not leak soil or water.

Further, the stretchable members 84 may be constructed to have an internal bias to return to the non-stretched condition shown in FIG. 33. With such construction, the stretchable members 84 may be the sole means for biasing the container 10n into the erected position.

In operation, the container 10n is biased to be in the erected condition (FIG. 33). In this condition, each stretchable member 84 is in a normal, unstretched condition.

When external pressure overcomes the bias of container 10n, the container 10n may be forced to assume the flat condition (FIG. 34). In this condition, each stretchable member 84 is stretched laterally and bent over from top to bottom such that a top portion 86 of each stretchable member 84 overlays a bottom portion 88 of the stretchable member 84.

When the external pressure is removed, the container 10n erects itself. It should be appreciated that any of the means disclosed herein for biasing containers into the erect condition may be employed with the container 10n.

When the external pressure is removed, the container 10n erects itself. It should be appreciated that any of the means disclosed herein for biasing containers into the erect condition may be employed with the container 10n.

Embodiment of FIGS. 35 and 36

Referring to FIGS. 35 and 36, shown therein and designated by reference character 10p is another collapsible, self-erecting container constructed in accordance with the present invention and a method for applying an inner liner 90 and an outer cover 92 to the container 10p.

As best seen in FIG. 35, the upper surface of the bottom 14 of the container 10p is provided with one or more adhesive spots. One of these adhesive spots is designated by reference numeral 94b and is generally representative of the adhesive spots on the bottom 14 of the container 10p.

Similarly, the outer surface of each lower wall member 32 is provided with at least one adhesive spot. One of these adhesive spots is designated by reference character 94w and is generally representative of the adhesive spots on the lower wall members 32 of the container 10p.

It should be appreciated that the container 10p may comprise any of the container embodiments disclosed herein. Further, it should be understood that the container 10p includes any of the means disclosed herein for biasing the container 10p into the erected position shown in FIG. 36. For clarity of illustration, such biasing means is not shown in FIGS. 35 and 36.

As shown in FIG. 35, a first sheet of material 92s is provided and the collapsed container 10p is placed onto the first sheet 92s. Upon contact with the first sheet 92s, the adhesive spots 94w secure the first sheet 92s to the lower wall members 32 of the container 10p. It should be appreciated that adhesive spots may also be provided on the lower surface of the bottom 14 of the container 10p to secure the first sheet 92s to the bottom 14 of the container 10p.

Next, a second sheet of material 90s is provided and placed onto the container 10p. Thus, the container 10p is disposed between the two sheets of material 90s and 92s. Upon contact with the second sheet 90s, the adhesive spots 94b secure a portion of the second sheet 90s to the upper surface of the bottom 14 of the container 10p.

When the container 10p is allowed to spring into the erected condition, the second sheet 90s is drawn through the opening 18 into the container 10p as the top 12 separates from the bottom 14 of the container 10p. Thus, the second sheet 90s defines the inner liner 90. By being attached to the lower wall members 32, the first sheet 92s is drawn up around the outside of the container 10p to define the outer cover 92.

It should be appreciated that the container 10p may be provided with only the inner liner 90, with only the outer cover 92, or with both the inner liner 90 and the outer cover 92. The sheets 90s and 92s may be provided in a wide variety of colors, decorative patterns and degrees of transparency or opacity. Further, the sheets 90s and 92s may provided in numerous shapes, such as circular, rectangular, polygonal and even irregular shapes.

The sheets 90s and 92s may also be provided in a wide range of sizes. For example, the sheets 90s and 92s may be sized to extend beyond the top 12 of the container 10p, to be substantially even with the top 12 of container 10p, or to extend only part of the way to the top 12 of the container 10p when the container 10p is in the erected condition.

The sheets 90s and 92s should be flexible enough to be drawn into the container 10p and up around the sides of the container 10p when the container 10p springs into the erected condition. However, the sheets 90s and 92s should have sufficient rigidity to assume the desired shape when the container 10p erects itself.

Although both the sheets 90s and 92s may be decorative only, it is often desirable that at least one of the sheets 90s and 92s be waterproof. Thus, the sheets 90s and 92s may be constructed of a poly film, waxed paper, waterproof cloth or the like.

It should be appreciated that the sheets 90s and 92s may be affixed to the bottom 14 and walls 20 (wall members 30 and/or 32) of the container 10p in any way as an alternative to the adhesive spots. For example, any pattern of adhesive or cohesive material, sonic welds or stapling may be used. If waterproofing is desired and stapling or the like is employed, any holes in the sheets of material should be sealed with a waterproof sealant.

With this construction, the container 10p with waterproof or decorative inner liner 90 and outer cover 92 may be stored and shipped in the flat condition. When the container 10p is to be used, the container 10p is simply allowed to self-erect and it is ready to receive a plant, floral arrangement, soil, water or any other items.

Changes may be made in the combinations, operations and arrangements of the various parts and elements described herein without departing from the spirit and scope of the invention as defined in the following claims.

What is claimed is:

1. A collapsible, self-erecting container comprising:

a bottom member;

a plurality of wall members each pivotally connected to the bottom member and each having a longitudinal edge separated from an adjacent wall member such that the wall members are movable between an erected position wherein the wall members extend from the bottom member so as to cooperate with the bottom member to form an object receiving space and a collapsed position wherein each wall member is folded downward into a substantially flattened condition relative to the bottom member;

resilient biasing means for biasing the wall members in the erected position, for permitting the wall members to be moved to the collapsed position from the erected position by a bias overcoming force exerted on the wall members, and for drawing the wall members from the collapsed position to the erected position when the bias overcoming force is removed from the wall members; and a foldable member extending between each adjacent pair of wall members so as to substantially cover the space between the adjacent wall members when the wall members are in the erected position and when the wall members are moved to the collapsed position.

2. The collapsible, self-erecting container of claim 1 wherein each of the bottom member, the wall members, and the foldable member are waterproof, and wherein the foldable member extends between the adjacent wall members and the bottom member so as to seal the space between the adjacent wall members.

3. The collapsible, self-erecting container of claim 1 wherein each of the wall members includes an upper wall section and a lower wall section, the lower wall section pivotally connected to the bottom member and pivotally connected to the upper wall section and wherein the foldable member is foldable so as to have at least one lengthwise fold when the wall members are in the erected position and at least one lateral fold when the wall members are in the collapsed position.

4. A collapsible, self-erecting container comprising:

a bottom member;

a plurality of wall members each pivotally connected to the bottom member and each having a longitudinal edge separated from an adjacent wall member such that the wall members are movable between an erected position wherein the wall members extend from the bottom member so as to cooperate with the bottom member to form an object receiving space and a collapsed position wherein each wall member is folded downward into a substantially flattened condition relative to the bottom member; and resilient biasing means extending between each adjacent pair of wall members for substantially covering the space between the adjacent wall members, for biasing the wall members in the erected position, for permitting the wall members to be moved to the collapsed position from the erected position by a bias overcoming force exerted on the wall members, and for drawing the wall members from the collapsed position to the erected position when the bias overcoming force is removed from the wall members.

5. The collapsible, self-erecting container of claim 4 wherein the resilient biasing means comprises a panel of elastic material.

6. The collapsible, self-erecting container of claim 4 wherein the resilient biasing means, the bottom member, and the wall members are waterproof, and wherein the resilient biasing means extends between the adjacent wall members and the bottom member so as to seal the space between the adjacent wall members.

7. The collapsible, self-erecting container of claim 6 wherein the resilient biasing means comprises a panel of elastic material.

8. A collapsible, self-erecting container comprising:

a bottom member;

a plurality of wall members each pivotally connected to the bottom member and each having a longitudinal edge separated from an adjacent wall member such that the wall members are movable between an erected position wherein the wall members extend from the bottom member so as to cooperate with the bottom member to form an object receiving space and a collapsed position wherein each wall member is folded downward into a substantially flattened condition relative to the bottom member; and a stretchable member secured between each adjacent pair of wall members so as to substantially cover the space between the adjacent wall members, the stetchable member having an unstretched condition wherein the wall members are caused to be biased in the erected position and a stretched condition wherein the wall members are held in the collapsed position by a bias overcoming force exerted on the wall members, the stretchable member returning to the unstretched condition and thereby drawing the wall members from the collapsed position to the erected position when the bias overcoming force is removed from the wall members.

9. The collapsible, self-erecting container of claim 8 wherein the bottom member, stretchable member and the wall members are waterproof, and wherein the stretchable member extends between the adjacent wall members and the bottom member so as to seal the space between the adjacent wall members.

* * * * *

UNITED STATES PATENT AND TRADEMARK OFFICE
CERTIFICATE OF CORRECTION

PATENT NO.    : 5,878,945
DATED         : March 9, 1999
INVENTOR(S)   : Donald E. Weder It is certified that error appears in the above-identified patent and that said Letters Patent is hereby corrected as shown below:

Column 4,
Line 52, after "in" and before "the" delete "if".

Column 5,
Lines 27 and 28, after "wall" insert -- 20 --.
Line 34, after "opening" insert -- 18 --.
Line 44, after "walls" insert -- 20 --.

Column 6,
Lines 16 and 18, after "retaining" and before "areas" insert -- tab --.
Line 60, after "walls" insert -- 20 -- and after "member" insert -- 12 --.

Column 8,
Line 45, after "top" insert -- 12 --.

Column 9,
Line 15, delete "end".

Column 12,
Line 29, delete "ion" and substitute -- 10n -- therefor.

Column 13,
Line 41, before "provided" insert -- be --.

Column 14,
Line 39, delete "are" and substitute -- is -- therefor.

Signed and Sealed this

Twentieth Day of May, 2003

JAMES E. ROGAN
*Director of the United States Patent and Trademark Office*